(12) United States Patent
Minagawa et al.

(10) Patent No.: US 12,000,365 B2
(45) Date of Patent: Jun. 4, 2024

(54) SEALED BATTERY, BATTERY PACK AND BATTERY FOR ENGINE IGNITION

(71) Applicant: ELIIY POWER CO., LTD., Tokyo (JP)

(72) Inventors: Atsuhiko Minagawa, Shinagawa-ku (JP); Keisuke Sawanishi, Shinagawa-ku (JP); Tomoyuki Yuasa, Shinagawa-ku (JP)

(73) Assignee: ELIIY POWER CO., LTD, Tokyo (JP)

( * ) Notice: Subject to any disclaimer, the term of this patent is extended or adjusted under 35 U.S.C. 154(b) by 630 days.

(21) Appl. No.: 16/493,031

(22) PCT Filed: Feb. 22, 2018

(86) PCT No.: PCT/JP2018/006546
§ 371 (c)(1),
(2) Date: Oct. 4, 2019

(87) PCT Pub. No.: WO2018/168386
PCT Pub. Date: Sep. 20, 2018

(65) Prior Publication Data
US 2020/0035965 A1 Jan. 30, 2020

(30) Foreign Application Priority Data
Mar. 16, 2017 (JP) ................. 2017-051466

(51) Int. Cl.
*F02N 11/08* (2006.01)
*H01M 50/103* (2021.01)
(Continued)

(52) U.S. Cl.
CPC ....... *F02N 11/0862* (2013.01); *H01M 50/103* (2021.01); *H01M 50/124* (2021.01);
(Continued)

(58) Field of Classification Search
CPC .. H01M 50/183; H01M 50/50; H01M 50/209; H01M 50/176; H01M 50/553;
(Continued)

(56) References Cited

U.S. PATENT DOCUMENTS 4,636,445 A 1/1987 Yamano et al.
10,062,882 B2 * 8/2018 Schoenherr ........... H01M 50/20
(Continued)

FOREIGN PATENT DOCUMENTS

EP 3 453 060 A1 3/2019
GB 149351 A * 7/1920
(Continued)

OTHER PUBLICATIONS

Machine translation of KR20030037827A (Year: 2003).*
(Continued)

*Primary Examiner* — Milton I Cano
*Assistant Examiner* — Mary G Henshaw
(74) *Attorney, Agent, or Firm* — Stites & Harbison, PLLC; Jeffrey A. Haeberlin; Trevor T. Graves

(57) ABSTRACT

A sealed battery according to the present invention includes an electrode assembly including a positive electrode, a negative electrode, and a separator; an electrolyte; a case; a first lead terminal; and a second lead terminal, wherein each of the first and second lead terminals includes an electrode connection section, an external connection section, and a sealing section, the first or the second lead terminal includes a conduction section, the conduction section is provided to be at least partially in contact with an outer surface of the case directly or indirectly, the case has a conductivity or an apparent thermal conductivity of from 10 W/(m·K) to 250 W/(m·K) inclusive, and the electrode assembly and the
(Continued)

electrolyte contained in the case have an effective thermal conductivity of from 10 W/(m·K) to 100 W/(m·K) inclusive in a steady state.

19 Claims, 3 Drawing Sheets

(51) Int. Cl.
*H01M 50/124* (2021.01)
*H01M 50/176* (2021.01)
*H01M 50/188* (2021.01)
*H01M 50/209* (2021.01)
*H01M 50/50* (2021.01)
*H01M 50/531* (2021.01)
*H01M 50/553* (2021.01)

(52) U.S. Cl.
CPC ....... *H01M 50/176* (2021.01); *H01M 50/188* (2021.01); *H01M 50/209* (2021.01); *H01M 50/50* (2021.01); *H01M 50/531* (2021.01); *H01M 50/553* (2021.01); *H01M 2220/20* (2013.01)

(58) Field of Classification Search
CPC ............. H01M 50/124; H01M 50/531; H01M 50/103; H01M 50/188; H01M 2220/20; F02N 11/0862
See application file for complete search history.

(56) References Cited

U.S. PATENT DOCUMENTS

| | | | | |
|---|---|---|---|---|
| 10,340,498 | B2* | 7/2019 | Oh | H01M 10/0525 |
| 10,770,730 | B2* | 9/2020 | Bisaro | H01M 50/124 |
| 10,790,495 | B2* | 9/2020 | Botadra | H01M 50/211 |
| 11,289,746 | B2* | 3/2022 | Schoenherr | H01M 10/0472 |
| 2003/0017387 | A1* | 1/2003 | Marukawa | H01M 50/209 |
| | | | | 429/178 |
| 2013/0130007 | A1 | 5/2013 | Orihara et al. | |
| 2014/0087231 | A1* | 3/2014 | Schaefer | H01M 10/6554 |
| | | | | 429/120 |
| 2015/0037617 | A1* | 2/2015 | Cabiri | H01M 50/116 |
| | | | | 429/7 |
| 2016/0204410 | A1 | 7/2016 | Heo | |
| 2020/0127269 | A1* | 4/2020 | Park | H01M 50/531 |

FOREIGN PATENT DOCUMENTS

| | | | | | |
|---|---|---|---|---|---|
| JP | S61-99278 | A | | 5/1986 | |
| JP | H05-202834 | A | | 8/1993 | |
| JP | H08-203497 | A | | 8/1996 | |
| JP | H10-275637 | A | | 10/1998 | |
| JP | H11345604 | A | * | 12/1999 | |
| JP | 2005-056681 | A | | 3/2005 | |
| JP | 2005-174691 | A | | 6/2005 | |
| JP | 2006-172870 | A | | 6/2006 | |
| JP | 2006-351326 | A | | 12/2006 | |
| JP | 2007-018917 | A | | 1/2007 | |
| JP | 2012079833 | A | * | 4/2012 | ............ H01G 11/12 |
| JP | 2012-169166 | A | | 9/2012 | |
| JP | 2015179578 | A | * | 10/2015 | |
| JP | 2017-004885 | A | | 1/2017 | |
| KR | 2004-0107040 | A | | 12/2004 | |
| KR | 10-2016-0087220 | A | | 7/2016 | |
| WO | 2012/020721 | A1 | | 2/2012 | |
| WO | WO-2017063876 | A1 | * | 4/2017 | |

OTHER PUBLICATIONS

Japan Patent Office, International Search Report issued in corresponding Application No. PCT/JP2018/006546, dated Apr. 17, 2018.
European Patent Office, Extended European Search Report issued in corresponding Application No. 18766602.9, dated Sep. 14, 2020.
Korean Intellectual Property Office, Office Action (Request for the Submission of an Opinion) in corresponding application No. KR 10-2019-7029624, dispatched Feb. 18, 2023.

* cited by examiner

[FIG. 1]
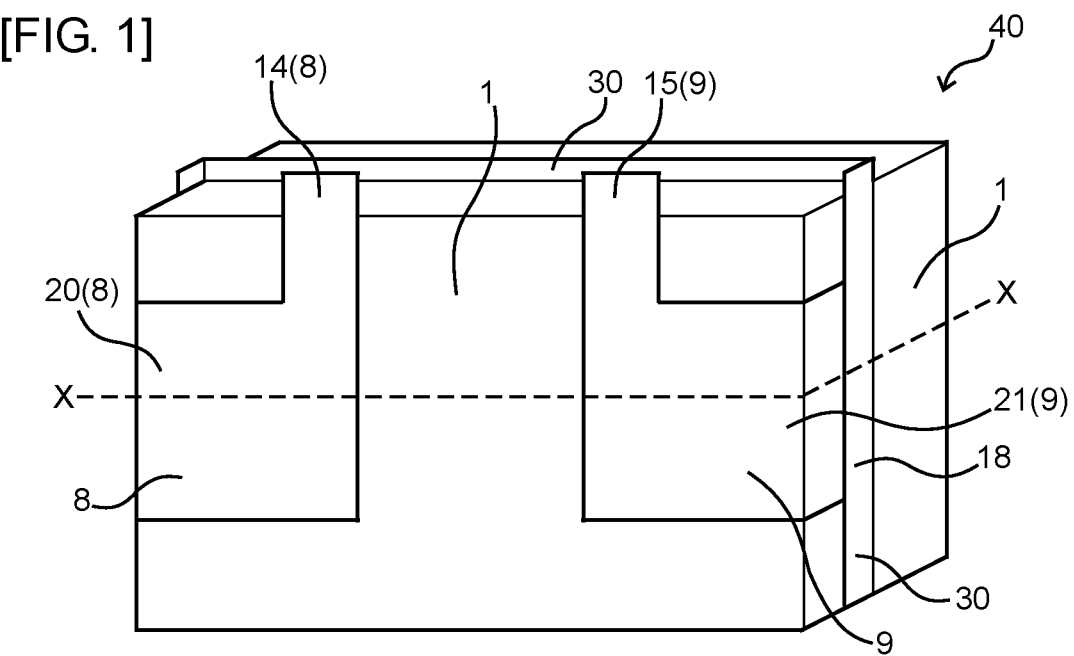
[FIG. 2]
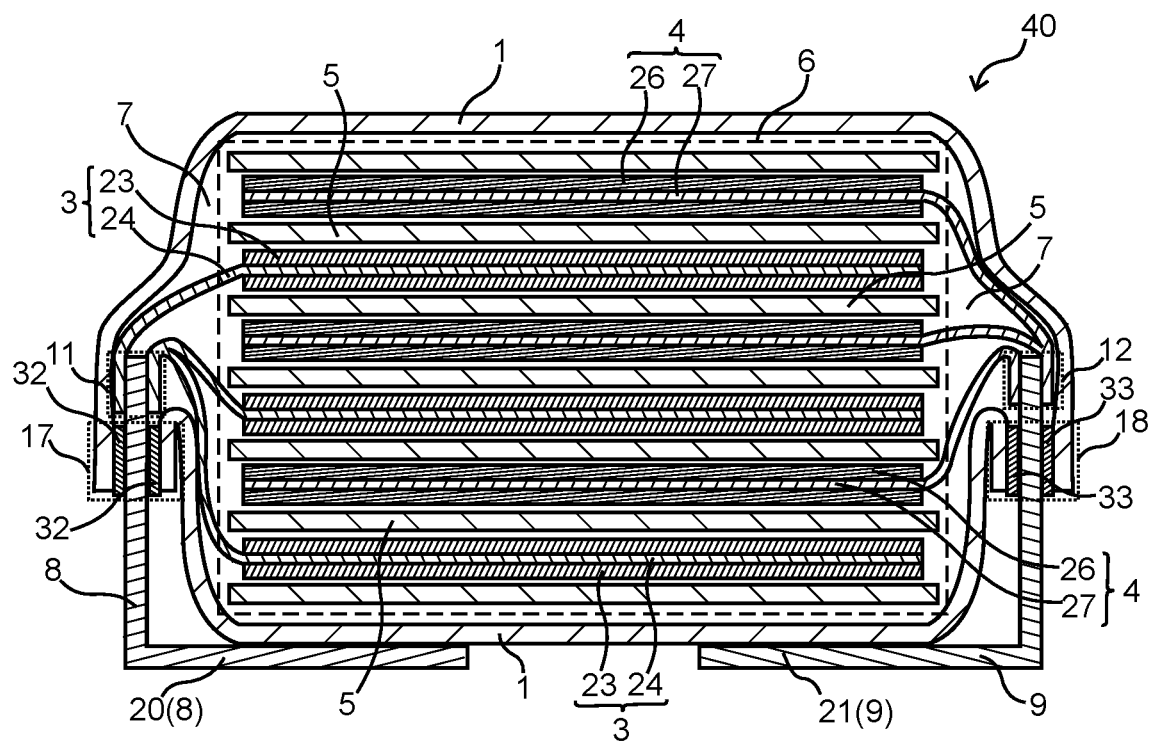

[FIG. 3]
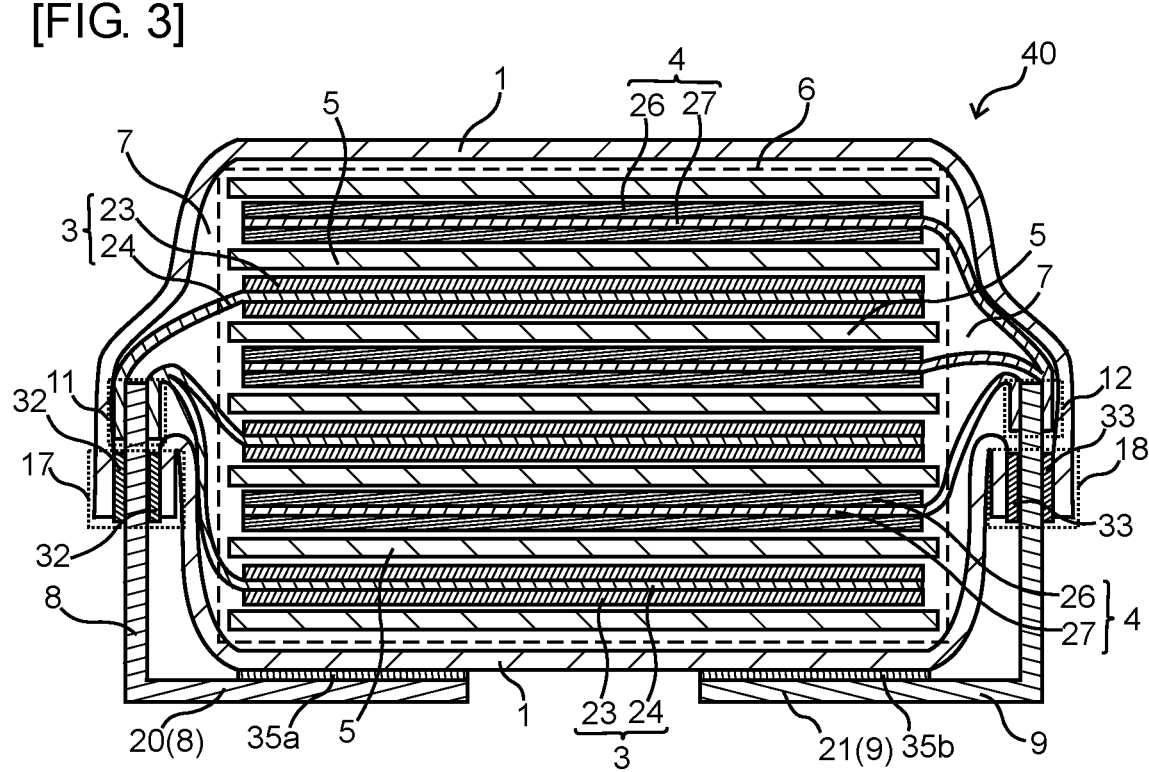
[FIG. 4]
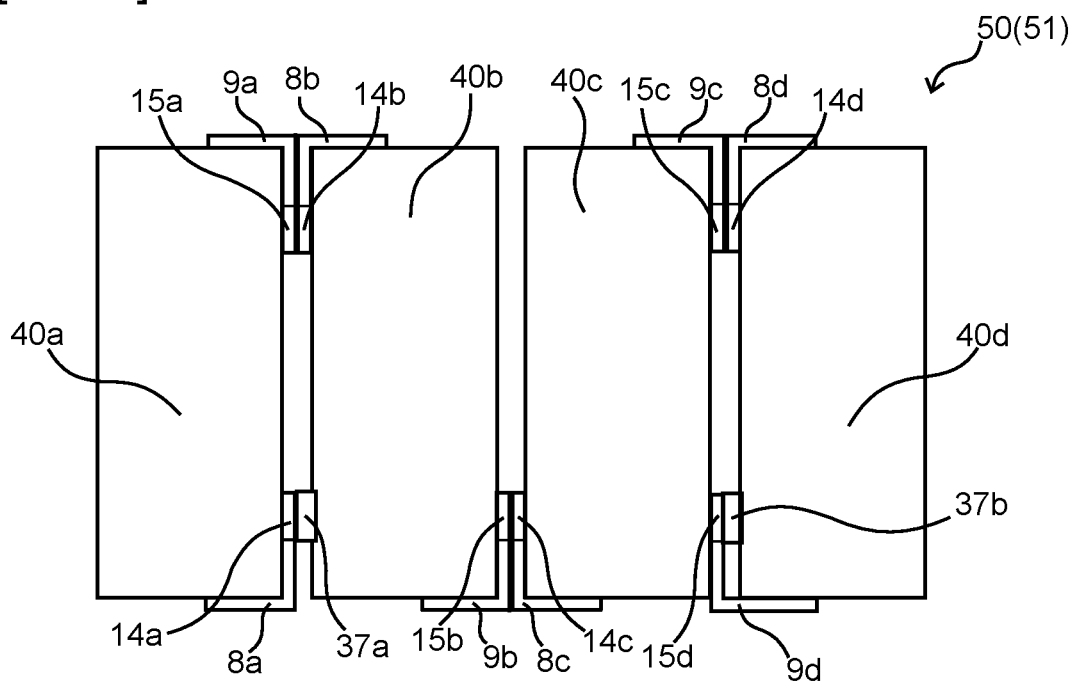

[FIG. 5]
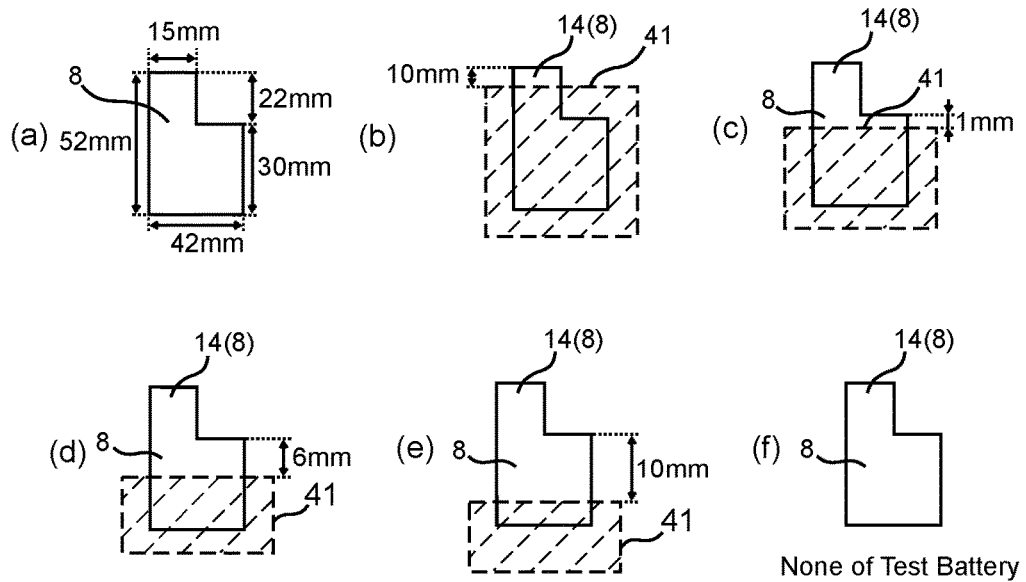
[FIG. 6]
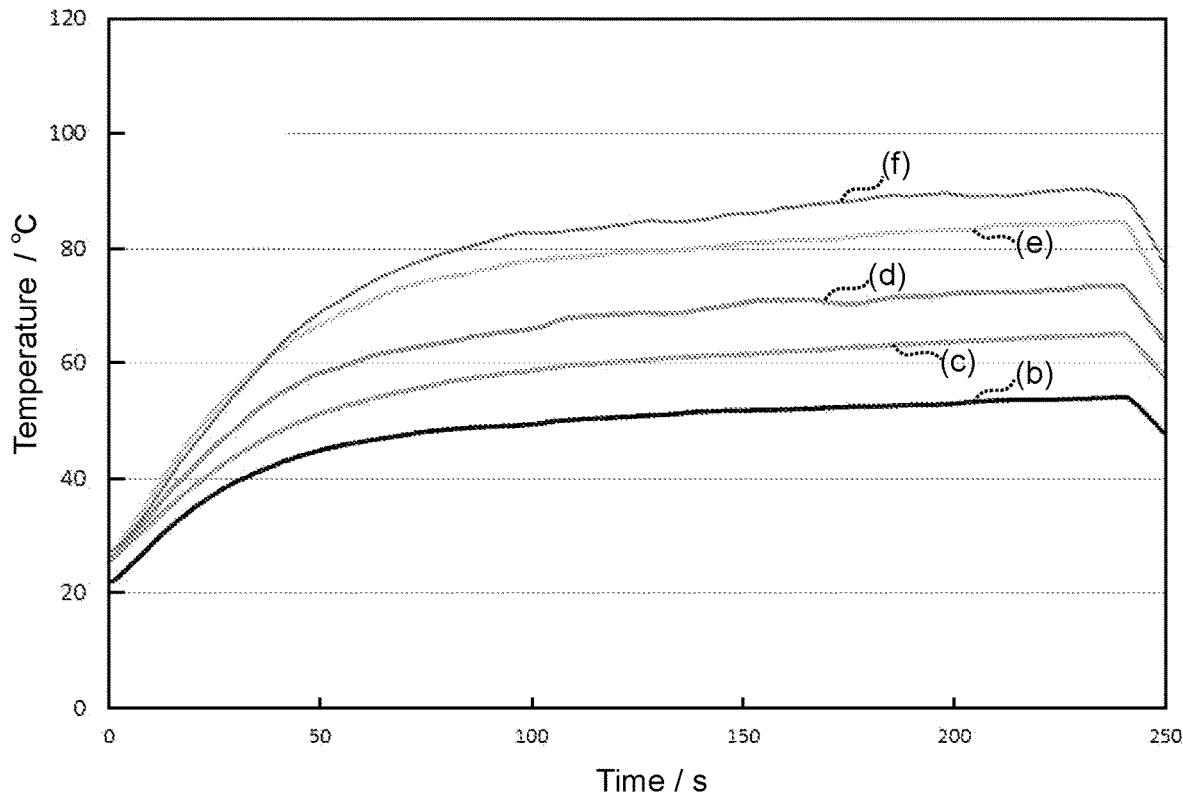

SEALED BATTERY, BATTERY PACK AND BATTERY FOR ENGINE IGNITION

TECHNICAL FIELD

The present invention relates to a sealed battery, an assembled battery, and a battery for engine starting.

BACKGROUND ART

A pouch battery including a positive electrode, a negative electrode, a separator, and an electrolyte which are housed inside a case made of a laminate film have been put into practical use. In the pouch battery, a part of a lead terminal is positioned inside the case and connected to the positive electrode or the negative electrode, and a part of the lead terminal is positioned outside of the case and connected to an external wiring. The laminate film is bonded to the lead terminal on the peripheral end of the case for sealing the interior of the case. Further, in order to improve performance of sealing the interior of the case, a terminal bonding tape is interposed between the laminate film and the lead terminal (for example, see Patent Document 1). When the laminate film is heat-sealed, the bonding tape is melted and fills a gap between the laminate film and the lead terminal.

Meanwhile, a battery for engine starting is mounted on a vehicle or a motorcycle. Large power is needed to start the engine, and thus, the battery needs to output large power in a short period of time (for example, see Patent Document 2).

CITATION LIST

Patent Document

Patent Document 1: WO 2012/020721 A1
Patent Document 2: JP 05-202834 A

SUMMARY OF THE INVENTION

Problem to be Solved by the Invention

When the pouch battery is used for a battery for engine starting, a large current flows through the lead terminal upon start of the engine, and the lead terminal generates heat. Due to the generated heat, a terminal bonding portion is melted, which may deteriorate sealing performance of the battery.

The present invention is accomplished in view of the above circumstance, and provides a sealed battery capable of preventing from a decrease in sealing performance of the battery.

Means for Solving the Problems

The present invention provides a sealed battery comprising: an electrode assembly including a positive electrode, a negative electrode, and a separator; an electrolyte; a case which houses the electrode assembly and the electrolyte; a first lead terminal; and a second lead terminal, wherein each of the first lead terminal and the second lead terminal comprises an electrode connection section which is connected to the positive electrode or the negative electrode inside the case, an external connection section positioned outside the case, and a sealing section to which the case is bonded via an adhesive layer, the first lead terminal or the second lead terminal comprises a conduction section serving as a conduction path between the sealing section and the external connection section, the conduction section is provided to be at least partially in contact with an outer surface of the case directly or to be at least partially in contact with the outer surface of the case indirectly via an intermediate layer, the case has a conductivity or an apparent thermal conductivity of from 10 W/(m·K) to 250 W/(m·K) inclusive, and the electrode assembly and the electrolyte contained in the case have an effective thermal conductivity of from 10 W/(m·K) to 100 W/(m·K) inclusive in a steady state.

Effect of the Invention

The sealed battery according to the present invention includes: an electrode assembly including a positive electrode, a negative electrode, and a separator; an electrolyte; a case which houses the electrode assembly and the electrolyte; a first lead terminal; and a second lead terminal, and each of the first lead terminal and the second lead terminal includes an electrode connection section which is connected to the positive electrode or the negative electrode inside the case, and an external connection section positioned outside the case. Thus, a terminal voltage can be generated between the external connection section of the first lead terminal and the external connection section of the second lead terminal, and electric power can be supplied to devices or vehicles.

Each of the first and second lead terminals includes a sealing section to which the case is bonded via an adhesive layer. Thus, the performance of sealing the interior of the case can be improved, whereby leakage of the electrolyte in the case can be prevented.

The first or the second lead terminal includes a conduction section serving as a conduction path between the sealing section and the external connection section. This makes it possible to provide the external connection section at a position distant from the sealing section, and thus, the sealed battery according to the present invention can be used for various types of devices.

The conduction section is provided to be at least partially in contact with the outer surface of the case directly, or provided to be at least partially in contact with the outer surface of the case indirectly via the intermediate layer. Thus, even if the sealed battery is discharged with a large current and the first or second lead terminal generates heat, the heat from the lead terminal can be dissipated to the case.

The case has a conductivity or an apparent thermal conductivity of from 10 W/(m·K) to 250 W/(m·K) inclusive, and the electrode assembly and the electrolyte contained in the case have an effective thermal conductivity of from 10 W/(m·K) to 100 W/(m·K) inclusive in a steady state. Thus, heat from the lead terminal can be dissipated to the electrode assembly and the electrolyte via the case, whereby an increase in the temperature of the first or second lead terminal can be prevented. This results in preventing the adhesive layer at the sealing section from being melted, whereby deterioration in sealing performance of the battery can be suppressed.

BRIEF DESCRIPTION OF THE DRAWINGS

FIG. 1 is a schematic perspective view of a sealed battery according to one embodiment of the present invention.

FIG. 2 is a schematic sectional view of the sealed battery along a broken line X-X in FIG. 1.

FIG. 3 is a schematic sectional view of the sealed battery according to one embodiment of the present invention.

FIG. 4 is a schematic top view of an assembled battery or a battery for engine starting according to one embodiment of the present invention.

FIGS. 5(a) to 5(f) are explanatory views of a lead terminal used in a conduction experiment.

FIG. 6 is a graph showing the result of the conduction experiment.

EMBODIMENTS OF THE INVENTION

The sealed battery according to the present invention is characterized by comprising: an electrode assembly including a positive electrode, a negative electrode, and a separator; an electrolyte; a case which houses the electrode assembly and the electrolyte; a first lead terminal; and a second lead terminal, wherein each of the first lead terminal and the second lead terminal includes an electrode connection section which is connected to the positive electrode or the negative electrode inside the case, an external connection section arranged outside the case, and a sealing section to which the case is bonded via an adhesive layer, the first lead terminal or the second lead terminal includes a conduction section serving as a conduction path between the sealing section and the external connection section, the conduction section is provided to be at least partially in contact with an outer surface of the case directly or provided to be at least partially in contact with the outer surface of the case indirectly via an intermediate layer, the case has a conductivity or an apparent thermal conductivity of from 10 W/(m·K) to 250 W/(m·K) inclusive, and the electrode assembly and the electrolyte contained in the case have an effective thermal conductivity of from 10 W/(m·K) to 100 W/(m·K) inclusive in a steady state.

Preferably, the heat capacity per 1 g of a sum total of the case, the electrode assembly, and the electrolyte contained in the sealed battery according to the present invention is from 0.5 J/(g·K) to 2.0 J/(g·K). This makes it possible to increase an amount of heat that can be dissipated to the case, the electrode assembly, and the electrolyte by the conduction section, whereby an increase in the temperature of the lead terminal can be suppressed.

Preferably, the conduction section included in the sealed battery according to the present invention is provided such that 60% or more of the conduction section is in contact with the outer surface of the case directly or indirectly. This makes it possible to prevent the temperature of the portion of the lead terminal not in contact with the case from being excessively increased.

Preferably, the intermediate layer included in the sealed battery according to the present invention is a grease layer. This makes it possible to increase the contact area between the conduction section and the grease layer, and to increase the contact area between the grease layer and the outer surface of the case. Thus, heat from the lead terminal can be efficiently dissipated to the case. In addition, the intermediate layer is preferably an insulator layer. With this configuration, even if the outer surface of the case is conductive, flow of a leak current can be prevented.

Preferably, the conduction section included in the sealed battery according to the present invention is provided on the electrode assembly so as to at least partially overlap the electrode assembly via the case. This makes it possible to bring the conduction section which is substantially flat into direct or indirect contact with the outer surface of the case which is substantially flat, whereby heat from the lead terminal can be efficiently dissipated to the case.

It is preferable that the first lead terminal includes a first electrode connection section connected to the positive electrode inside the case, a first external connection section positioned outside of the case, and a first sealing section to which the case is bonded via a first adhesive layer. It is also preferable that the second lead terminal includes a second electrode connection section connected to the negative electrode inside the case, a second external connection section positioned outside of the case, and a second sealing section to which the case is bonded via a second adhesive layer. It is also preferable that the electrode assembly is positioned between the first sealing section and the second sealing section. This makes it possible to lead the first lead terminal out of one end of the case and to lead the second lead terminal out of the opposite end. Thus, even if each of the first conduction section and the second conduction section is in contact with the outer surface of the case directly or indirectly, a decrease in a space between the first lead terminal and the second lead terminal can be prevented, and thus, flow of a leak current can be prevented. In addition, heat from the first lead terminal and the second lead terminal can be uniformly distributed to the electrode assembly and the electrolyte.

Preferably, the effective thermal conductivity of the electrode assembly and the electrolyte contained in the case is equal to or greater than the thermal conductivity or the apparent thermal conductivity of the case. Thus, heat from the case can be quickly transmitted to the electrode assembly and the electrolyte. Accordingly, even if the heat dissipation time is increased, the separator is prevented from being damaged by heat accumulated in the case.

Preferably, the case is made of a laminate film. This makes it possible to prevent the separator from being damaged due to a local temperature increase in the case.

The present invention also provides an assembled battery comprising a plurality of the sealed batteries according to the present invention, wherein the external connection section included in a first sealed battery is electrically connected to the external connection section included in a second sealed battery. In the assembled battery, the sealed batteries can be connected in series, whereby a higher voltage can be output. Further, in the assembled battery, the sealed batteries can be connected in parallel, whereby the capacity can be increased.

Preferably, the conduction section included in the first sealed battery in the assembled battery according to the present invention is provided to be at least partially in contact with the outer surface of the case included in the second sealed battery directly or provided to be at least partially in contact with the outer surface of the case included in the second sealed battery indirectly via the intermediate layer. This makes it possible to dissipate heat from the lead terminal of the first sealed battery to the electrode assembly or the electrolyte of the second sealed battery via the case, whereby an excessive increase in the temperature of the first or second lead terminal can be prevented.

The present invention also provides a assembled battery comprising a first sealed battery and a second sealed battery, wherein each of the first and second sealed batteries includes: an electrode assembly including a positive electrode, a negative electrode, and a separator; an electrolyte; an case which houses the electrode assembly and the electrolyte; a first lead terminal; and a second lead terminal, wherein each of the first lead terminal and the second lead terminal includes an electrode connection section which is connected to the positive electrode or the negative electrode inside the case, an external connection section positioned outside the case, and a sealing section to which the case is bonded via an adhesive layer, the first lead terminal or the second lead terminal includes a conduction section serving as a conduction path between the sealing section and the external connection section, the conduction section included in the first sealed battery is provided to be at least partially in contact with an outer surface of the case included in the second sealed battery directly or provided to be at least partially in contact with the outer surface of the case included in the second sealed battery indirectly via the intermediate layer, the case included in the second sealed battery has a conductivity or an apparent thermal conductivity of from 10 W/(m·K) to 250 W/(m·K) inclusive, and the electrode assembly and the electrolyte contained in the case included in the second sealed battery have an effective thermal conductivity of from 10 W/(m·K) to 100 W/(m·K) inclusive in a steady state.

The present invention also provides a battery for engine starting including the assembled battery according to the present invention.

One embodiment of the present invention will now be described with reference to the drawings. The configurations shown in the drawings and the following description are merely illustrative, and the scope of the present invention is not limited thereto.

FIG. 1 is a schematic perspective view of a sealed battery according to the present embodiment, and FIG. 2 is a schematic sectional view of the sealed battery along a broken line X-X in FIG. 1. FIG. 3 is a schematic sectional view of the sealed battery according to the present embodiment, and corresponds to the schematic sectional view of the sealed battery along the broken line X-X in FIG. 1. FIG. 2 illustrates the sealed battery in which a conduction section and an outer surface of a case are in contact with each other directly, and FIG. 3 illustrates the sealed battery in which the conduction section and the outer surface of the case are in contact with each other indirectly with an intermediate layer interposed therebetween. FIG. 4 is a schematic top view of an assembled battery or a battery for engine starting according to the present embodiment.

A sealed battery 40 according to the present embodiment is characterized by including: an electrode assembly 6 including a positive electrode 3, a negative electrode 4, and a separator 5; an electrolyte 7; a case 1 housing the electrode assembly 6 and the electrolyte 7; a first lead terminal 8; and a second lead terminal 9, wherein the first lead terminal 8 and the second lead terminal 9 respectively includes electrode connection sections 11 and 12 which are connected to the positive electrode 3 or the negative electrode 4 inside the case 1, external connection sections 14 and 15 positioned outside the case 1, and sealing sections 17 and 18 to which the case 1 is bonded via adhesive layers 32 and 33, the first lead terminal 8 or the second lead terminal 9 includes conduction section 20 or 21 serving as a conduction path between the sealing section 17 or 18 and the external connection section 14 or 15; the conduction sections 20 and 21 are provided to be at least partially in contact with the outer surface of the case 1 directly or provided to be at least partially in contact with the outer surface of the case 1 indirectly via an intermediate layer 35, the case 1 has a thermal conductivity or an apparent thermal conductivity of from 10 W/(m·K) to 250 W/(m·K) inclusive, and the electrode assembly 6 and the electrolyte 7 contained in the case 1 have an effective thermal conductivity of from 10 W/(m·K) to 100 W/(m·K) inclusive in a steady state.

An assembled battery 50 or a battery 51 for engine starting according to the present embodiment is characterized by including a plurality of the sealed batteries 40 according to the present embodiment, wherein the external connection section 14 included in the first sealed battery 40 and the external connection section 15 included in the second sealed battery 40 are electrically connected to each other.

The sealed battery, the assembled battery, and the battery for engine starting according to the present embodiment will now be described.

The sealed battery 40 according to the present embodiment has a sealed structure in which the electrolyte is completely sealed from the outside air so as to prevent leakage during energy storage or during discharge. The sealed battery 40 according to the present embodiment may be a secondary battery or a non-aqueous electrolyte secondary battery. Examples of the sealed battery 40 according to the present embodiment include lithium-ion batteries, lead-acid batteries, nickel-hydrogen batteries, and nickel-cadmium batteries.

The assembled battery 50 according to the present embodiment or the battery 51 for engine starting according to the present embodiment may be constituted by a plurality of sealed batteries 40. For example, the assembled battery 50 and the battery 51 for engine starting can be formed by connecting a plurality of sealed batteries 40a to 40d in series as in the assembled battery 50 (battery 51 for engine starting) shown in FIG. 4.

The case 1 is a casing that houses the electrode assembly 6 including the positive electrode 3, the negative electrode 4, and the separator 5, and the electrolyte 7. The material of the case 1 is, for example, a laminate film, plastic, or metal. The case 1 can be formed to have a closed space for housing the electrode assembly 6 and the electrolyte 7 therein. If the material of the case 1 is a laminate film, the sealed battery 40 according to the present embodiment is a pouch battery. In this case, the case 1 has, on its peripheral edge, a weld part 30 on which the laminate film is overlaid and welded. The laminate film is formed by laminating a resin film on both surfaces of a metal film. The thickness of the laminate film is, for example, 50 to 200 μm.

The electrode assembly 6 includes the positive electrode 3, the negative electrode 4, and the separator 5. The electrode assembly 6 may have a stacked structure in which the positive electrode 3 and the negative electrode 4 arranged with the separator 5 therebetween are stacked, or may have a wound structure in which the positive electrode 3 and the negative electrode 4 are wound with the separator 5 therebetween. For example, the electrode assembly 6 may include a single separator 5 folded in a zigzag fashion, and the positive electrode 3 and the negative electrode 4 which are disposed in valley folds of the separator 5 and which are alternately disposed with the separator 5 therebetween. The number of the positive electrodes 3 and the negative electrodes 4 included in the single electrode assembly 6 may be set, as appropriate, according to the required battery capacity. The sealed battery 40 may have a plurality of electrode assemblies 6.

The separator 5 has a sheet shape and is interposed between the positive electrode 3 and the negative electrode 4. The separator 5 is not particularly limited, as long as it can prevent flow of short-circuit current between the positive electrode 3 and the negative electrode 4 and allow the electrolyte to pass therethrough. Examples of the separator 5 include a microporous film made of polyolefin or polyethylene.

The positive electrode 3 can be configured to include a positive-electrode current collector 24 and a positive-electrode active material layer 23 formed on the positive-electrode current collector 24. The positive electrode 3 can be manufactured by forming the positive-electrode active material layer 23 on both surfaces of the rectangular positive-electrode current collector 24. The positive electrode 3 may have a sheet shape. The positive electrode 3 can include a terminal connection section to be connected to the first electrode connection section 11 of the first lead terminal 8. The terminal connection section can be formed in such a way that the positive-electrode active material layer 23 is not formed on both surfaces of the positive-electrode current collector 24 at the end of the positive electrode 3. Alternatively, the terminal connection section can be formed in such a way that a projecting tab is formed on one end of the positive-electrode current collector 24 so as to project outward therefrom, and the positive-electrode active material layer 23 is not formed on the tab.

The positive-electrode current collector 24 is not particularly limited, as long as it has electric conductivity and is provided with the positive-electrode active material layer 23 on the surface. For example, the positive-electrode current collector 24 is a metal foil, and preferably, an aluminum foil. The thickness of the positive-electrode current collector 24 is 100 μm to 400 μm, for example.

The positive-electrode active material layer 23 can be formed on the positive-electrode current collector 24 in such a way that a conductive agent and a binder are added to a positive-electrode active material, and the resultant is coated with a coating method. The positive-electrode active material is, for example, a lithium transition metal composite oxide capable of reversibly intercalation and deintercalation of lithium ions. Specific examples of the positive-electrode active material include $LiCoO_2$, $LiNiO_2$, $LiNi_xCo_{1-x}O_2$ (x=0.01-0.99), $LiMnO_2$, $LiMn_2O_4$, $LiCo_xMn_yNi_zO_2$ (x+y+z=1), and olivine-type $LiFePO_4$ and $Li_xFe_{1-y}M_yPO_4$ (wherein: 0.05≤x≤1.2 and 0≤y≤0.8; and M is at least one of Mn, Cr, Co, Cu, Ni, V, Mo, Ti, Zn, Al, Ga, Mg, B, and Nb). These materials can be used singly, or two or more kinds can be used as a mixture.

The negative electrode 4 can be configured to include a negative-electrode current collector 27 and a negative-electrode active material layer 26 formed on the negative-electrode current collector 27. The negative electrode 4 can be manufactured by forming the negative-electrode active material layer 26 on both surfaces of the rectangular negative-electrode current collector 27. The negative electrode 4 may have a sheet shape. The negative electrode 4 can include a terminal connection section to be connected to the second electrode connection section 12 of the second lead terminal 9. The terminal connection section can be formed in such a way that the negative-electrode active material layer 26 is not formed on both surfaces of the negative-electrode current collector 27 at the end of the negative electrode 4. Alternatively, the terminal connection section can be formed in such a way that a tab is formed on one end of the negative-electrode current collector 27, and the negative-electrode active material layer 26 is not formed on the tab.

The negative-electrode current collector 27 is not particularly limited, as long as it has electric conductivity and is provided with the negative-electrode active material layer 26 on the surface. For example, the negative-electrode current collector 27 is a metal foil, and preferably, a copper foil. The thickness of the negative-electrode current collector 27 is 100 μm to 400 μm, for example.

The negative-electrode active material layer 26 can be formed on the negative-electrode current collector 27 in such a way that a conductive agent and a binder are added to a negative-electrode active material, and the resultant is coated with a coating method. When the sealed battery is a lithium ion secondary battery, examples of the negative-electrode active material include graphite, partially graphitized carbon, hard carbon, soft carbon, $LiTiO_4$, and Sn alloy. These materials can be used singly, or two or more kinds can be used as a mixture.

Examples of the solvent used in the electrolyte 7 include carbonates, lactones, ethers, and esters. Two or more kinds of these solvents can be used as a mixture. Among these solvents, a mixture of a cyclic carbonate and a chain carbonate is particularly preferable. The electrolyte 7 is a solution prepared by, for example, dissolving a lithium salt solute such as $LiCF_3SO_3$, $LiAsF_6$, $LiClO_4$, $LiBF_4$, $LiPF_6$, LiBOB, $LiN(CF_3SO_2)_2$, or $LiN(C_2F_5SO_2)$ in an organic solvent. The electrolyte 7 may be blended with, as required, one or more types of additives such as VC (vinylene carbonate), PS (propane sultone), VEC (vinyl ethylene carbonate), PRS (propene sultone), and a flame retardant.

The first lead terminal 8 has the first electrode connection section 11 to be connected to the positive electrode 3 inside the case 1, the first external connection section 14 positioned outside the case 1, and the first sealing section 17 bonded to the case 1 via the first adhesive layer 32. The second lead terminal 9 has the second electrode connection section 12 to be connected to the negative electrode 4 inside the case 1, the second external connection section 15 positioned outside the case 1, and the second sealing section 18 bonded to the case 1 via the second adhesive layer 33. Due to the first lead terminal 8 and the second lead terminal 9 configured as described above being provided, a terminal voltage can be generated between the first external connection section 14 and the second external connection section 15, and electric power can be supplied to devices or vehicles. The sealed battery 40 can be charged by applying a voltage between the first external connection section 14 and the second external connection section 15.

The first electrode connection section 11 indicates an area where the positive-electrode current collector 24 is welded to the first lead terminal 8. The second electrode connection section 12 indicates an area where the negative-electrode current collector 27 is welded to the second lead terminal 9.

The external connection sections 14 and 15 are connected to external wirings. The external connection sections 14 and 15 may be connected to wiring terminals, external connection sections of other batteries, or a battery connection terminal 37 of a device.

For example, in the assembled battery 50 (battery 51 for engine starting) shown in FIG. 4, an external connection section 15a of the sealed battery 40a may be connected to an external connection section 14b of the sealed battery 40b. An external connection section 15d of the sealed battery 40d may be connected to a battery connection terminal 37b of a device.

The first sealing section 17 indicates an area where the first lead terminal 8 is bonded to the case 1 using the first adhesive layer 32. The second sealing section 18 indicates an area where the second lead terminal 9 is bonded to the case 1 using the second adhesive layer 33. Due to the adhesive layers 32 and 33 being interposed between the lead terminals 8 and 9 and the case 1, the gap between the lead terminals 8 and 9 and the case 1 can be filled, whereby the performance of sealing the interior of the case 1 can be improved. The sealing sections 17 and 18 can be provided on the peripheral edge of the case 1. The adhesive layers 32 and 33 may be a bonding tape or an adhesive agent layer.

The lead terminals 8 and 9 are formed of, for example, a metal plate having a thickness of 100 μm to 500 μm. The metal plate may be pressed or bent. The surface of the metal plate may be treated with plating or the like. For example, the first lead terminal 8 is an aluminum plate, and the second lead terminal 9 is a copper plate. The lead terminals 8 and 9 may have a rectangular shape or an L shape, for example. The lead terminals 8 and 9 may have tabs serving as the external connection sections 14 and 15. The lead terminals 8 and 9 may be formed by processing a single metal plate.

The first lead terminal 8 has a first conduction section 20 serving as a conduction path between the first sealing section 17 and the first external connection section 14. The second lead terminal 9 has a second conduction section 21 serving as a conduction path between the second sealing section 18 and the second external connection section 15. The formation of the conduction sections 20 and 21 makes it possible to provide the external connection sections 14 and 15 at positions distant from the sealing sections 17 and 18, and this enables the sealed battery 40 to be used for various types of devices. Note that it is only sufficient that the conduction section is provided on at least either the first lead terminal 8 or the second lead terminal 9.

The conduction sections 20 and 21 can be provided to occupy 50% or more, 60% or more, 70% or more, or 80% or more of the lead terminals 8 and 9. This makes it possible to provide the external connection sections 14 and 15 at positions distant from the sealing sections 17 and 18.

The conduction sections 20 and 21 are provided to be at least partially in contact with the outer surface of the case 1 directly, or provided to be at least partially in contact with the outer surface of the case 1 indirectly with the intermediate layer 35 therebetween. For this reason, even if the sealed battery 40 is discharged with a large current and the first or the second lead terminal generates heat, the heat generated from the lead terminal 8 or 9 can be dissipated to the case 1. The conduction sections 20 and 21 can be provided, for example, to be in direct contact with the outer surface of the case 1 as in the sealed battery 40 shown in FIGS. 1 and 2. Thus, the heat from the lead terminals 8 and 9 can be directly dissipated to the case 1.

The conduction sections 20 and 21 can be provided, for example, to in contact with the outer surface of the case 1 indirectly with the intermediate layer 35 therebetween as in the sealed battery 40 shown in FIG. 3. The intermediate layer 35 can be provided to be in direct contact with the outer surface of the case, and to be in direct contact with the conduction sections 20 and 21.

The intermediate layer 35 may be a grease layer. The formation of the grease layer between the conduction sections 20 and 21 and the outer surface of the case 1 makes it possible to increase the contact area between the conduction section 20 and the grease layer and the contact area between the grease layer and the outer surface of the case 1. Thus, the heat from the lead terminals 8 and 9 can be efficiently dissipated to the case 1. The grease layer is preferably a thermal conductive grease layer. Examples of the grease layer include the one obtained by mixing, into grease, metal oxide powders such as alumina or zinc oxide, inorganic particles such as diamond, silica, or silicon carbide, or metal powders such as silver or aluminum.

The intermediate layer 35 may be an insulator layer. When the insulator layer is interposed between the conduction sections 20 and 21 and the outer surface of the case 1, the flow of leak current can be prevented even if the outer surface of the case 1 is conductive.

It is preferable that a material by which the apparent thermal conductivity of 10 W/(m·K) or higher of the case 1 including the intermediate layer 35 is achieved is selected for the intermediate layer 35.

The conduction sections 20 and 21 can be provided such that 60% or more of the conduction sections 20 and 21 are in contact with the outer surface of the case 1 directly or indirectly. This makes it possible to prevent a temperature rise in areas of the conduction sections 20 and 21 not in contact with the outer surface of the case 1 directly or indirectly. The conduction sections 20 and 21 can be provided such that 65% or more, 70% or more, 75% or more, or 80% or more of the conduction sections 20 and 21 are in contact with the outer surface of the case 1 directly or indirectly.

The lead terminals 8 and 9 may contact the outer surface of the case 1 or the intermediate layer 35 at a position where the length of the lead terminals from the electrode connection side end is 1.5 times or less the thickness of the sealed battery 40.

The conduction sections 20 and 21 can be provided on the electrode assembly 6 so as to at least partially overlap the electrode assembly 6 via the case 1. Thus, the conduction sections 20 and 21 which are substantially flat can be directly or indirectly in contact with the outer surface of the case 1 which is substantially flat, whereby heat from the lead terminals 8 and 9 can be efficiently dissipated to the case 1. In this case, the electrode assembly 6 can be configured to have a stacked structure.

The electrode assembly 6 can be positioned between the first sealing section 17 and the second sealing section 18. With this configuration, the first lead terminal 8 can be leaded out from one end of the case 1, and the second lead terminal 9 can be leaded out from the other end. Thus, even when both of the first conduction section 20 and the second conduction section 21 are brought into contact with the outer surface of the case 1 directly or indirectly, a decrease in the space between the first lead terminal 8 and the second lead terminal 9 can be prevented, and the flow of leak current can be prevented. In addition, heat from the first lead terminal 8 and the second lead terminal 9 can be uniformly distributed to the electrode assembly 6 and the electrolyte 7.

The first conduction section 20 can be brought into contact with one side of the case 1 directly or indirectly, and the second conduction section 21 can be brought into contact with the opposite side of the case 1 directly or indirectly. With this configuration, the electrode assembly 6 can be interposed between the first conduction section 20 and the second conduction section 21, whereby an increase in the temperature of the lead terminals 8 and 9 can be prevented.

At least a part of the conduction sections 20 and 21 included in the first sealed battery 40 may be directly in contact with the outer surface of the case 1 included in the second sealed battery 40.

Alternatively, at least a part of the conduction sections 20 and 21 included in the first sealed battery 40 may be indirectly in contact with the outer surface of the case 1 included in the second sealed battery 40 with the intermediate layer 35 therebetween. With this configuration, even if the first sealed battery 40 is discharged with a large current and the first lead terminal 8 or the second lead terminal 9 generates heat, the generated heat from the lead terminal 8 or 9 can be dissipated to the case 1 of the second sealed battery 40. For example, a conduction section of a lead terminal 9d of the sealed battery 40d included in the assembled battery 50 (battery 51 for engine starting) shown in FIG. 4 can be provided to be directly or indirectly in contact with the outer surface of the case 1 of the adjacent sealed battery 40c. Further, at least a part of the conduction sections 20 and 21 included in the first sealed battery 40 may be sandwiched between the first sealed battery 40 and the second sealed battery 40.

The case 1 has a thermal conductivity or apparent thermal conductivity of from 10 W/(m·K) to 250 W/(m·K) inclusive. Thus, the case 1 can transmit heat, and the heat from the lead terminals 8 and 9 can be dissipated to the case 1, the electrolyte 7, the electrode assembly 6, or the like. The case 1 may have a thermal conductivity or apparent thermal conductivity of from 10 W/(m·K) to 250 W/(m·K) inclusive in the thickness direction. The case 1 may have a thermal conductivity or apparent thermal conductivity of from 10 W/(m·K) to 100 W/(m·K) inclusive. The thermal conductivity or the apparent thermal conductivity may be obtained by a laser flash method. According to the result and calculation by simulation, it is found that the thermal conductivity or apparent thermal conductivity of 10 W/(m·K) or more is sufficient.

In the laser flash method, one of the main surfaces of a plate-shaped sample constituting the case 1 is irradiated with a laser beam and instantaneously heated, and the thermal diffusivity and thermal conductivity can be calculated on the basis of an increase in the temperature of the back surface opposite to the surface irradiated with the laser beam. When the case 1 is formed from a single material, the thermal conductivity is calculated, and when the case 1 is formed from a composite material, the apparent thermal conductivity is calculated.

The electrode assembly 6 and the electrolyte 7 housed in the case 1 have an effective thermal conductivity of from 10 W/(m·K) to 100 W/(m·K) inclusive in a steady state. Thus, the heat dissipated from the conduction sections 20 and 21 to the case 1 can be transmitted to the entire electrode assembly 6 and the entire electrolyte 7. This can prevent a local temperature increase in the conduction sections 20 and 21, the case 1, the electrode assembly 6, and the electrolyte 7. In the present embodiment, the effective thermal conductivity of the electrode assembly 6 and the electrolyte 7 is measured while they are housed in the case 1, and calculated from the measurement result. Therefore, the effective thermal conductivity is calculated with the electrode assembly 6 and the electrolyte 7 being regarded as an integrated unit, not with the electrode assembly 6 and the electrolyte 7 being treated as an individual member. The effective thermal conductivity in the steady state is calculated in such a manner that, for example, one of the outer surfaces of the case 1 included in the sealed battery 40 is heated with a hot plate, the opposite outer surface of the case 1 is cooled to a normal temperature, and the temperature gradient inside the sealed battery 40 in the steady state is measured. When the effective thermal conductivity is calculated according to simulation in consideration of the result of the case, it is found that the effective thermal conductivity of 10 W/(m·K) is sufficient.

The effective thermal conductivity of the electrode assembly 6 and the electrolyte 7 housed in the case 1 in the steady state may be equal to or greater than the thermal conductivity or the apparent thermal conductivity of the case 1. Thus, the heat of the case 1 can be quickly transmitted to the electrode assembly 6 and the electrolyte 7. Accordingly, even when the heat dissipation time is increased, the separator 5 is prevented from being damaged by heat accumulated in the case 1.

The heat capacity per 1 g of a sum total of the case 1, the electrode assembly 6, and the electrolyte 7 is 0.5 J/(g·K) to 2.0 J/(g·K). This can increase an amount of heat which can be dissipated to the case 1, the electrode assembly 6, and the electrolyte 7 by the conduction sections 20 and 21, whereby an increase in the temperature of the lead terminals 8 and 9 can be prevented. Accordingly, the adhesive layers 32 and 33 of the sealing sections 17 and 18 can be prevented from being melted by the heat of the lead terminals 8 and 9, and this can prevent deterioration of the performance of sealing the interior of the case 1.

Experiment for Manufacturing Test Battery According to Working Example

A paste was prepared using lithium iron phosphate powders used as a positive-electrode active material, acetylene black used as a conductive auxiliary agent, and polyvinylidene fluoride (PVdF) used as a binder. The prepared paste was coated on both surfaces of an aluminum foil serving as a positive-electrode current collector and dried. Thus, a positive electrode provided with positive-electrode active material layers on both surfaces of the aluminum foil was manufactured.

A paste was prepared using soft carbon used as a negative-electrode active material, styrene-butadiene copolymer (SBR) used as a binder, and carboxymethylcellulose (CMC) used as a thickener. The prepared paste was coated on both surfaces of a copper foil serving as a negative-electrode current collector, dried, and pressed. Thus, a negative electrode provided with negative-electrode active material layers on both surfaces of the copper foil was manufactured.

Thirty positive electrodes, a separator (thickness: 16 μm) made of a polyethylene material, and thirty-one negative electrodes were stacked so that the adjacent positive-electrode active material layer and the negative-electrode active material layer face each other with the separator therebetween, and the positive electrodes and the negative electrodes were singly covered by the separator. The positive-electrode current collectors included in the thirty positive electrodes were welded to a first lead terminal, and the negative-electrode current collectors included in the thirty-one negative electrodes were welded to a second lead terminal. An aluminum plate having a size as shown in FIG. 5(*a*) with a thickness of 200 μm was used for the first lead terminal, and a copper plate having a size as shown in FIG. 5(*a*) with a thickness of 200 μm was used for the second lead terminal. The electrode assembly was covered by a laminate film, and the peripheral edge of the laminate film was welded to form a case. An adhesive layer was provided between the laminate film and the lead terminals, and the lead terminals and the adhesive layer were welded to the laminate film. Thereafter, an electrolyte solution (non-aqueous solvent: EC/DEC/EMC=27.5/5/67.5 (additive: 0.7% of VC, 0.3% of FEC), lithium salt: 1.2 mol/L of LiPF$_6$) was injected into the case through a liquid injection port, and the electrode assembly was impregnated with the electrolyte solution. Then, the case was degassed, and the liquid injection port was closed. In this way, a test battery according to Working Example with a capacity of 4.5 Ah was manufactured. Note that the used laminate film was formed by laminating a polyethylene terephthalate layer on an outer side of an aluminum layer and a polyethylene layer on an inner side of the aluminum layer.

Experiment for Manufacturing Test Battery According to Comparative Example

A test battery according to Comparative Example was manufactured by changing the material of the laminate film. The test battery was manufactured in the same manner as the test battery according to Working Example except that the material of the laminate film was changed. In Comparative Example, the laminate film was formed by laminating a polyethylene terephthalate layer on an outer side of a stainless steel layer and a polyethylene layer on an inner side of the stainless steel layer.

Measurement of Thermal Conductivity

The thermal conductivities of the laminate films used for manufacturing the test batteries were measured with a laser flash method. The thermal conductivity of the laminate film used for manufacturing the test battery according to Working Example in the thickness direction was about 17 W/(m·K). The thermal conductivity of the laminate film used for manufacturing the test battery according to Comparative Example in the thickness direction was about 9.2 W/(m·K).

The thermal conductivity of the electrode assembly and the electrolyte included in the test battery according to Working Example was measured using a steady method. Specifically, one of the outer surfaces of the case included in the test battery according to Working Example was heated with a hot plate, and the opposite outer surface of the case was air-cooled. The temperature between the hot plate and the outer surface of the case, the temperature between the inner surface of the case and the electrode assembly, and the temperature of the air-cooled outer surface of the case were measured in a steady state to obtain a temperature gradient. The thermal conductivity of the electrode assembly and the electrolyte was calculated on the basis of the obtained temperature gradient. The thermal conductivity of the electrode assembly and the electrolyte was about 17.9 W/(m·K).

Calculation of Heat Capacity

The heat capacity per 1 g of a sum total of the case, the electrode assembly, and the electrolyte was calculated on the basis of the specific heat, density, and mass of the material used for manufacturing the test battery according to Working Example. The calculated heat capacity was 0.921 J/(g·K).

Conduction Experiment at 150 A

A DC current of 150 A was applied to aluminum plates (samples (b) to (f)) similar to the first lead terminal used for manufacturing the test battery according to Working Example for 240 seconds in a constant temperature chamber at 25° C., and the temperature of each of the aluminum plates was measured. The value of 150 A is the highest current value in lead-acid batteries for motorcycles in Japanese Industrial Standards (JISD 5302-2004).

In the sample (b), a DC current was applied while the portion (90.6% of the main surface of the lead terminal 8) other than the external connection section 14 of the lead terminal 8 (aluminum plate) was sandwiched between two test batteries (Working Example) as shown in FIG. 5(*b*). Heat generated from the lead terminal 8 due to the current being applied was dissipated to the test battery 41 via the portion where the lead terminal 8 and the test batteries (Working Example) were in contact with each other. In the sample (c), a DC current was applied while 76.6% of the main surface of the lead terminal 8 was sandwiched between two test batteries (Working Example). In the sample (d), a DC current was applied while 63.4% of the main surface of the lead terminal 8 was sandwiched between two test batteries (Working Example). In the sample (e), a DC current was applied while 52.8% of the main surface of the lead terminal 8 was sandwiched between two test batteries (Working Example). In the sample (f), a DC current was applied while the lead terminal 8 was not sandwiched between test batteries as shown in FIG. 5(*f*). FIG. 6 shows the measurement result.

When the current was continuously applied to the sample (f) for about 80 seconds, the temperature of the lead terminal exceeded 80° C. When the current was continuously applied for about 140 seconds to the sample (e) in which the contact area between the lead terminal and the test batteries (Working Example) was narrow, the temperature of the lead terminal exceeded 80° C. On the other hand, in the samples (d), (c), and (b), the temperature of the lead terminal did not rise to 80° C., even if current was continuously applied for 240 seconds. Accordingly, it is found that an increase in the temperature of the lead terminal can be prevented by bringing 60% or more of the lead terminal to be in contact with the outer surface of the case of the battery.

Discharge Experiment

In a constant temperature chamber at 25° C., the lead terminals were bent so that one side of the first and second conduction sections of the test battery according to Working Example was in contact with the outer surface of the case, and the conduction sections were fixed to the outer surface of the case with an insulating tape. The lead terminals were bent so that about 60% of the area of the lead terminals was in contact with the outer surface of the case. Then, the test battery according to Working Example was discharged for about 240 seconds so that about 150 A of current flew through the lead terminals. When the sealing sections of the test battery according to Working Example were checked after the discharge, a leakage of the electrolyte solution from the first sealing section and the second sealing section was not observed.

In a constant temperature chamber at 25° C., the lead terminals were bent so that one side of the first and second conduction sections of the test battery according to Comparative Example was in contact with the outer surface of the case, and the conduction sections were fixed to the outer surface of the case with an insulating tape. The lead terminals were bent so that about 60% of the area of the lead terminals was in contact with the outer surface of the case. Then, the test battery according to Comparative Example was discharged for about 240 seconds so that about 150 A of current flew through the lead terminals. When the sealing sections of the test battery according to Comparative Example were checked after the discharge, a leakage of the electrolyte solution was observed.

DESCRIPTION OF REFERENCE SIGNS

1 Case
3 Positive electrode
4 Negative electrode
5 Separator
6 Electrode assembly
7 Electrolyte
8, 8*a*, 8*b*, 8*c*, 8*d* First lead terminal
9, 9*a*, 9*b*, 9*c*, 9*d* Second lead terminal
11 First electrode connection section
12 Second electrode connection section
14, 14*a*, 14*b*, 14*c*, 14*d* First external connection section
15, 15*a*, 15*b*, 15*c*, 15*d* Second external connection section
17 First sealing section
18 Second sealing section
18 First conduction section
20 Second conduction section
21 Positive-electrode active material layer
23 Positive-electrode current collector
26 Negative-electrode active material layer
27 Negative-electrode current collector
30 Weld part
32 First adhesive layer
33 Second adhesive layer
35, 35*a*, 35*b* Intermediate layer
37, 37*a*, 37*b* Battery connection terminal 40, 40a, 40b, 40c, 40d Sealed battery
41 Test battery
50 Assembled battery
51 Battery for engine starting

What is claimed is:

1. A sealed battery comprising: an electrode assembly including a positive electrode, a negative electrode, and a separator; an electrolyte; a case which contains the electrode assembly and the electrolyte; a first lead terminal; and a second lead terminal, wherein
    each of the first lead terminal and the second lead terminal comprises an electrode connection section which is connected to the positive electrode or the negative electrode inside the case, an external connection section positioned outside the case, and a sealing section to which the case is bonded via an adhesive layer,
    the external connection section is configured to be directly physically connected to an external connection section of another adjacent sealed battery so as to charge or discharge the sealed battery including the electrode assembly,
    each of the first lead terminal and the second lead terminal is formed of a metal plate and has a tab serving as the external connection section, wherein the tab projects outward from the case,
    the first lead terminal or the second lead terminal comprises a conduction section serving as a conduction path between the sealing section and the external connection section, the conduction section not serving as the external connection section,
    the conduction section is configured to occupy 50% or more of the first or the second lead terminal and is configured to provide the external connection section at a position distant from the sealing section,
    the conduction section is provided to be at least partially in contact with an outer surface of the case directly or provided to be at least partially in contact with the outer surface of the case indirectly via an intermediate layer, wherein a contact portion of the conduction section is provided on the electrode assembly so as to at least partially overlap the electrode assembly via the outer surface of the case,
    the case has a conductivity or an apparent thermal conductivity of from 10 W/(mK) to 250 W/(mK) inclusive, and the electrode assembly and the electrolyte contained in the case have an effective thermal conductivity of from 10 W/(mK) to 100 W/(mK) inclusive in a steady state.

2. The sealed battery according to claim 1, wherein the heat capacity per 1 g of a sum total of the case, the electrode assembly, and the electrolyte is from 0.5 J/(gK) to 2.0 J/(gK).

3. The sealed battery according to claim 2, wherein the effective thermal conductivity of the electrode assembly and the electrolyte contained in the case is equal to or greater than the thermal conductivity or the apparent thermal conductivity of the case.

4. The sealed battery according to claim 2, wherein the conduction section is provided such that 60% or more of the conduction section is in contact with the outer surface of the case directly or indirectly.

5. The sealed battery according to claim 4, wherein the intermediate layer is a grease layer or an insulator layer.

6. The sealed battery according to claim 5, wherein the first lead terminal comprises a first electrode connection section connected to the positive electrode inside the case, a first external connection section positioned outside of the case, and a first sealing section to which the case is bonded via a first adhesive layer, the second lead terminal comprises a second electrode connection section connected to the negative electrode inside the case, a second external connection section positioned outside of the case, and a second sealing section to which the case is bonded via a second adhesive layer, and the electrode assembly is positioned between the first sealing section and the second sealing section.

7. The sealed battery according to claim 5, wherein the effective thermal conductivity of the electrode assembly and the electrolyte contained in the case is equal to or greater than the thermal conductivity or the apparent thermal conductivity of the case.

8. The sealed battery according to claim 7, wherein the case is made of a laminate film.

9. An assembled battery comprising a plurality of the sealed batteries according to claim 8, wherein the external connection section included in a first sealed battery is electrically connected to the external connection section included in a second sealed battery.

10. The assembled battery according to claim 9, wherein the conduction section included in the first sealed battery is provided to be at least partially in contact with the outer surface of the case included in the second sealed battery directly or provided to be at least partially in contact with the outer surface of the case included in the second sealed battery indirectly via the intermediate layer.

11. The sealed battery according to claim 4, wherein the effective thermal conductivity of the electrode assembly and the electrolyte contained in the case is equal to or greater than the thermal conductivity or the apparent thermal conductivity of the case.

12. The sealed battery according to claim 1, wherein the conduction section is provided such that 60% or more of the conduction section is in contact with the outer surface of the case directly or indirectly.

13. The sealed battery according to claim 12, wherein the intermediate layer is a grease layer or an insulator layer.

14. The sealed battery according to claim 12, wherein the effective thermal conductivity of the electrode assembly and the electrolyte contained in the case is equal to or greater than the thermal conductivity or the apparent thermal conductivity of the case.

15. The sealed battery according to claim 1, wherein the effective thermal conductivity of the electrode assembly and the electrolyte contained in the case is equal to or greater than the thermal conductivity or the apparent thermal conductivity of the case.

16. A battery for engine starting comprising an assembled battery comprising a plurality of the sealed batteries according to claim 1, wherein the external connection section included in a first sealed battery is electrically connected to the external connection section included in a second sealed battery.

17. An assembled battery comprising a first sealed battery and a second sealed battery, wherein
    each of the first and second sealed batteries comprises: an electrode assembly including a positive electrode, a negative electrode, and a separator; an electrolyte; a case which contains the electrode assembly and the electrolyte; a first lead terminal; and a second lead terminal,
    each of the first lead terminal and the second lead terminal comprises an electrode connection section which is connected to the positive electrode or the negative electrode inside the case, an external connection section positioned outside the case, and a sealing section to which the case is bonded via an adhesive layer, the external connection section is configured to be directly physically connected to an external connection section of another adjacent sealed battery so as to charge or discharge the first or second sealed battery including the electrode assembly, each of the first lead terminal and the second lead terminal is formed of a metal plate and has a tab serving as the external connection section, wherein the tab projects outward from the case, the first lead terminal or the second lead terminal comprises a conduction section serving as a conduction path between the sealing section and the external connection section, the conduction section not serving as the external connection section, the conduction section is configured to occupy 50% or more of the first or the second lead terminal and is configured to provide the external connection section at a position distant from the sealing section, the conduction section included in the first sealed battery is provided to be at least partially in contact with an outer surface of the case included in the second sealed battery directly or provided to be at least partially in contact with the outer surface of the case included in the second sealed battery indirectly via an intermediate layer, wherein a contact portion of the conduction section is provided on the electrode assembly so as to at least partially overlap the electrode assembly via the outer surface of the case, the case included in the second sealed battery has a conductivity or an apparent thermal conductivity of from 10 W/(mK) to 250 W/(mK) inclusive, and the electrode assembly and the electrolyte contained in the case included in the second sealed battery have an effective thermal conductivity of from 10 W/(mK) to 100 W/(mK) inclusive in a steady state.

18. The assembled battery according to claim 17, wherein the heat capacity per 1 g of a sum total of the case, the electrode assembly, and the electrolyte included in the second sealed battery is from 0.5 J/(gK) to 2.0 J/(gK).

19. A battery for engine starting comprising the assembled battery according to claim 11.

* * * * *